Nov. 11, 1924.

W. JANNELL 1,514,908

CENTERING MACHINE

Filed July 5 1921

4 Sheets-Sheet 1

INVENTOR
William Jannell
BY Baker & Macklin,
ATTORNEYS.

Nov. 11, 1924.

W. JANNELL

CENTERING MACHINE

Filed July 5, 1921

1,514,908

4 Sheets-Sheet 4

INVENTOR
William Jannell
BY Bates & Macklin
ATTORNEYS

Patented Nov. 11, 1924.

1,514,908

UNITED STATES PATENT OFFICE.

WILLIAM JANNELL, OF WEST PARK, OHIO, ASSIGNOR TO THE DOMESTIC ELECTRIC COMPANY, OF CLEVELAND, OHIO, A CORPORATION OF OHIO.

CENTERING MACHINE.

Application filed July 5, 1921. Serial No. 482,444.

*To all whom it may concern:*

Be it known that I, WILLIAM JANNELL, a citizen of the United States, residing at West Park, in the county of Cuyahoga and State of Ohio, have invented a certain new and useful Improvement in Centering Machines, of which the following is a full, clear, and exact description, reference being had to the accompanying drawings.

This invention relates to centering machines and is primarily concerned with the construction of a machine that is adapted for use in locating and marking the centers of small shafts.

One of the objects of my invention is the provision of a centering machine that is adapted to accommodate various sizes of small shafts, and that is capable of centering such shafts with a fair degree of precision. Another object is the construction of a machine that is provided with means for adjusting the work-holding elements, and for regulating the movement thereof, so that accurate work may be accomplished, by what is commonly termed "unskilled labor."

Still another object is the provision of a machine that is quite simple in construction, and is therefore capable of being cheaply manufactured.

In accomplishing the above objects, I employ a rotary marking tool that is positioned horizontally on a driving head, and I provide a carriage that may be manually reciprocated in alignment with the cutting tool. This carriage is provided with interengaging jaws that approach the work from opposite sides and securely hold it during the centering operation. Various adjustments are provided for maintaining the clamping members in positive alignment with the marking tool, and these adjustments are located so as to be convenient and accessible for the use of the operator.

The means for accomplishing the above objects will be more fully set forth in the following description which relates to the drawings, and the essential characteristics will be set forth in the claims.

Figure 1:
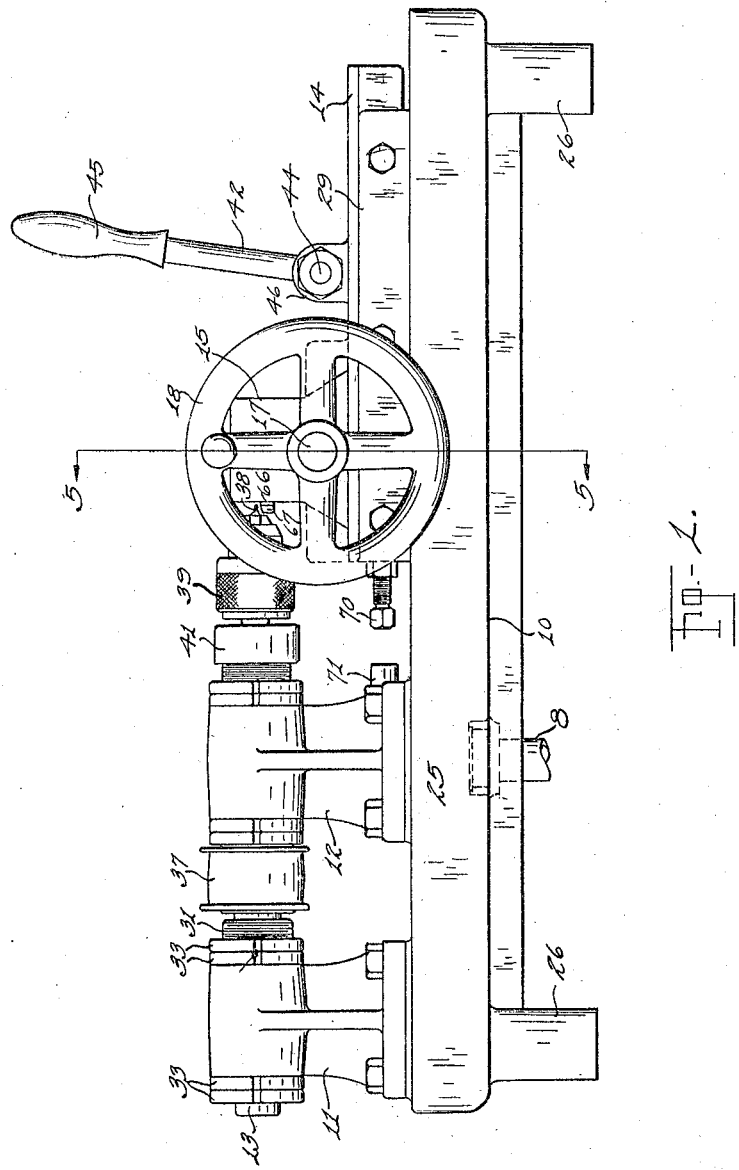
Figure 2:
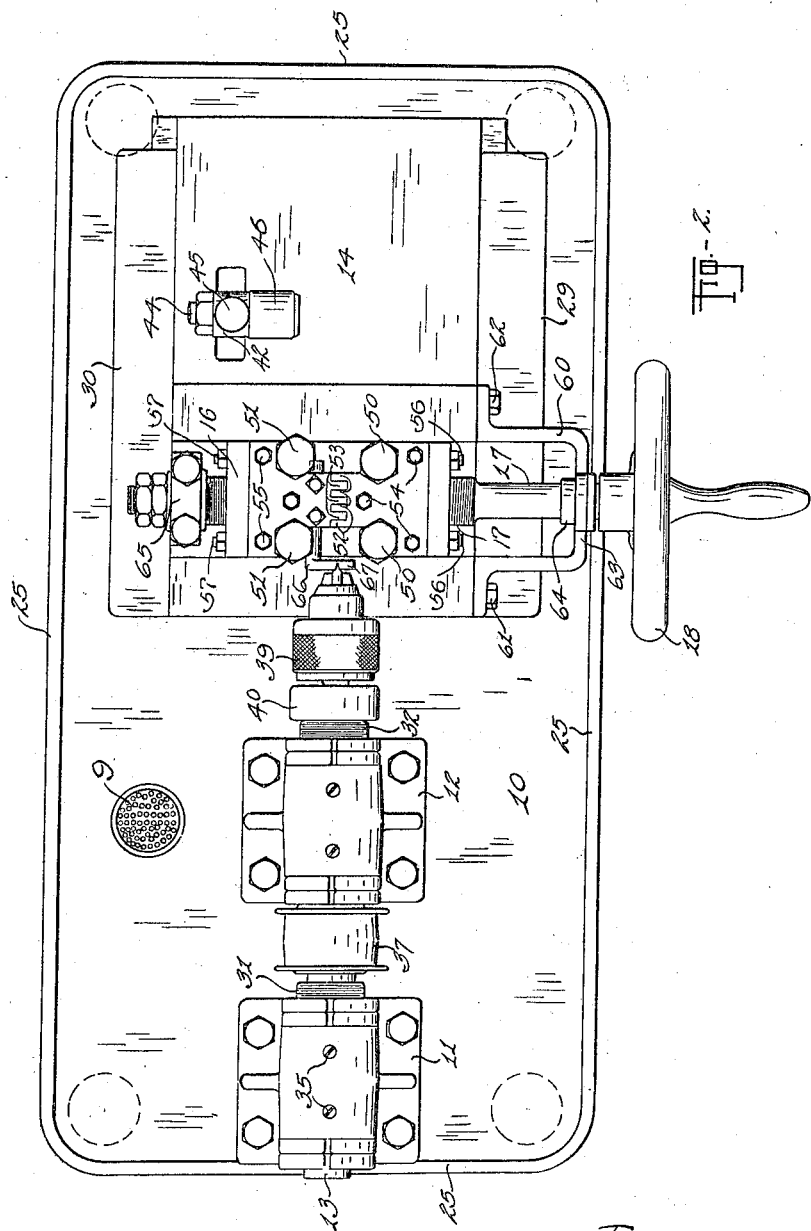
Figure 3:
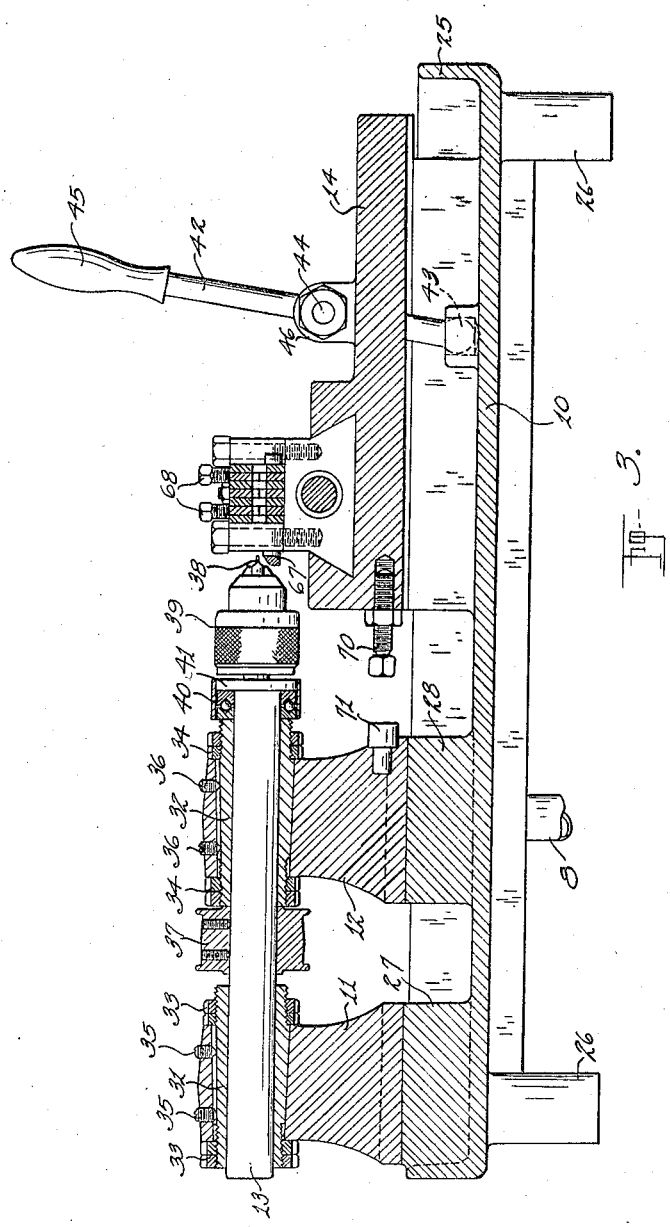
Figure 4:
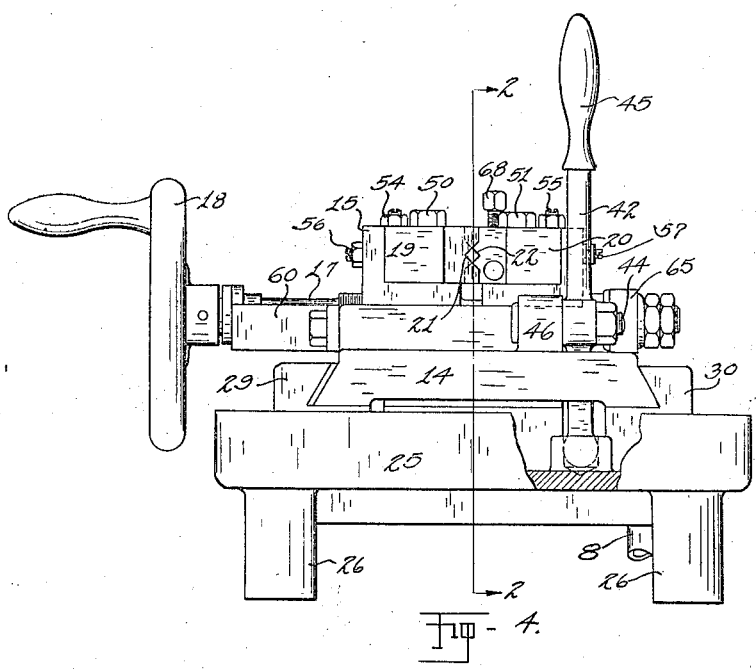
Figure 5:
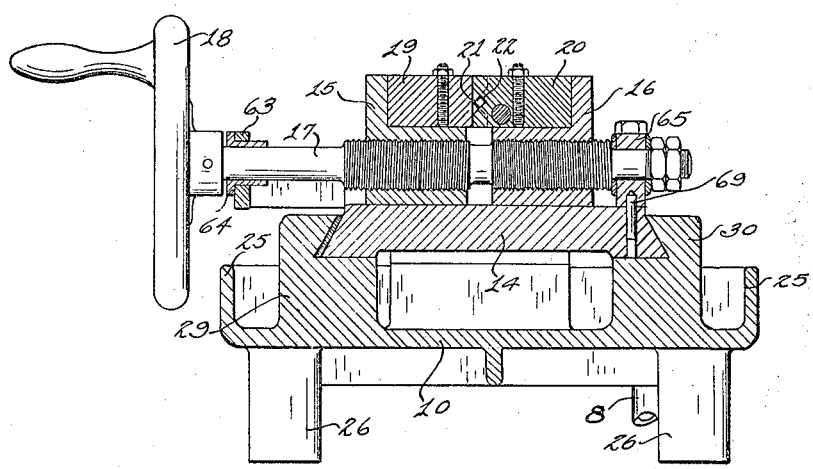

In the drawings, Fig. 1 is a side elevation of a centering machine embodying features of my invention.; Fig. 2 is the plan of such a machine; Fig. 3 is a vertical section taken through the center of the machine; Fig. 4 is an end elevation taken from the clamping side of the machine; Fig. 5 is a section taken through the clamping mechanism.

Designating the parts shown in the drawings by the use of reference characters, 10 represents the bed of a machine having brackets 11 and 12 that are rigidly secured to one end thereof, and adapted to provide bearing blocks for a driving shaft 13. At the other end of the bed, a carriage 14 is mounted so as to be reciprocated in alignment with the shaft 13, and is equipped with cross slides 15 and 16, that are operable by movement of a right and left hand screw 17 under control of a hand wheel 18. The cross slides serve as supporting means for a pair of interengaging jaws 19, 20, which jaws are recessed in a V-shaped form as at 21 and 22, for receiving the work and for holding it securely in position. This in general constitutes the construction of the machine, and the details thereof will now be described.

The bed 10 is shown as having a flange 25 extending upwardly around the marginal edges thereof, and is arranged to act as a basin for receiving the cutting lubricant, the pumping mechanism for which is not shown. A suitable outlet 8 however, is shown as leading from the bottom of the basin and is provided with a strainer 9. The bed is also shown as supported by the standards 26, which standards are preferably of short length and arranged to be secured to a bench or other stationary support. On one end of the bed I provide bosses 27 and 28, which receive the brackets 11 and 12, respectively, while on the other end of the bed I provide longitudinal bosses 29 and 30, that act as a guide way for the carriage 14.

To support the driving shaft 13, I have shown a pair of tapered bearings 31, 32, that extend through bearing blocks on the brackets 11 and 12 and are secured thereto by the adjusting nuts 33 and 34, respectively. Suitable set screws 35 and 36 may be employed to prevent rotation of the tapered bearing within the bearing blocks. To drive the shaft I provide a pulley 37 which is preferably positioned intermediate the bearings and is therefore mounted so as to distribute the strains equally between them.

The cutting tool 38 is mounted in a suitable head 39, and is secured to the shaft 13 in the customary manner. Adjacent the head 39, I provide a thrust bearing 40 which is shown as positioned intermediate the bearing 32 and the shoulder 41.

To reciprocate the carriage 14, I provide a lever 42 that is preferably equipped with the ball joint 43 at the lower end thereof, and is pivoted at 44 to a suitable lug 46 on the carriage. This lever may be provided with a handle 45 which is positioned adjacent the clamping mechanism so as to be conveniently positioned within reach of the operator.

The clamping mechanism, as heretofore explained, comprises a pair of oppositely disposed jaws 19 and 20 having V-shaped recesses that grip the work on opposite sides and thereby effectively hold it in position, preparatory to the centering operation. These jaws may be removably secured to the cross slides 15 and 16 by the screws 50 and 51 respectively, and be adjustable relatively thereto by vertical adjusting screws 54, 55 respectively, which screws provide for a three point support upon the cross slide and enable the vertical adjustment to be quickly and accurately accomplished. The clamping portions of the jaws, as shown in Fig. 2 comprise separated projecting fingers 52 on the jaw 19, and complementary fingers 53 on the jaw 20.

The cross slides 15, 16 are slidably mounted in the carriage 14 and are threaded to receive the right and left handed threaded portions respectively, of the screw 17. In positioning the slides upon the carriage, the threaded portions of the screw are brought simultaneously into engagement with the slides so that when the work is clamped, the axis thereof, is aligned with the axis of the tool 38. To maintain this alignment I provide adjusting screws 56 and 57, which are positioned above the differential screw and arranged to adjust the horizontal position of the clamping jaws with relation to the cross slides. The amount of such horizontal adjustment is ordinarily very small and provision may readily be provided for such adjustment by the employment of oversize holes through which the clamping screws 50 and 51 extend. Such adjustment enables the jaws to be retained in alignment in event of any inaccurate engagement between the screw and the cross slides.

To support the screw I provide on one end thereof, a bracket 60 which is substantially a U-shaped member having the ends thereof secured to the carriage, as at 61 and 62, and having the intermediate portion thereof, as at 63, provided with a bearing 64. The other end of the screw may be supported by a block 65, which block is shown as an upright member which is rigidly secured to the carriage, and maintained in alignment therewith by the dowel pin 69.

To gauge the work, I provide a member 66 which is shown as an L-shaped bar having the one leg thereof extending through an aperture in the jaw 20, and the other leg thereof, as at 67, positioned across the V-shaped recess in the jaw and below the line of the cutting tool 38. To adjust such gauge longitudinally, I provide a pair of adjusting screws 68 that extend through the jaw 20, and bear against that portion of the bar extending through the jaw.

To regulate the stroke of the carriage, I provide an adjusting screw 70 that may be positioned on the carriage and adapted to abut a stop 71 on the block 12. The purpose for controlling the travel of the carriage is to regulate the depth to which the centering tool is allowed to enter the work, and to prevent the gauge 67 from striking the rotary cutting tool.

The operation of my machine is as follows:—

Assuming that the driving shaft 13 is rotated by a source of power—not shown—and that the cutting tool 38 is rigidly positioned within the head 39, then the operator rotates the hand wheel 18 until the jaws 19 and 20 are separated by an amount sufficient to permit the entrance of a piece of work through the V-shaped portion of such jaws. The work is then moved forwardly toward the cutting head, until the forward portion thereof abuts the head 67 on the gauge, whereupon the hand wheel is rotated in the opposite direction and the jaws are brought into contact with the work, thereby clamping it securely and simultaneously centering it with relation to the axis of the cutting tool. The operator then moves the carriage 14 toward the tool 38 by oscillating the lever 42 in one direction. Such movement is continued until the adjusting screw 70 abuts the stop 71, thereby preventing the forward movement of the carriage. The lever 42 is then oscillated in a reverse direction and the hand wheel 18 is turned so as to release the work, whereupon the jaws are in position to receive another piece of work.

To maintain the clamping jaws in positive alignment with the cutting tool the operator may adjust the vertical screws 54 and 55, or the horizontal screws 56 and 57 respectively. The locking screws 50 and 51 are arranged to permit such adjustment and are conveniently positioned to facilitate the attainment of accurate alignment.

From the foregoing description it will be seen that I have provided a simple machine for centering shafts of small diameter, and that the machine enables the centering operation to be quickly and accurately accomplished. This machine is provided with suitable adjustments for maintaining the clamping mechanism in alignment with the axis of the cutting tool and is also provided with suitable gauges for positioning the work, and for regulating the depth of the cut therein. One of the advantages of my machine is that the centering of shafts having various sizes and diameters may be quickly and effectively accomplished by the employment of unskilled labor.

Having thus described my invention, I claim:

1. In combination, a bed, a carriage adapted to be reciprocated thereon, cross slides, means for moving the slides simultaneously and transversely of the carriage in a horizontal direction, jaws having V-shaped recesses and removably secured to said slides, means for adjusting the jaws vertically with relation to said slides and an adjustable work stop slidably mounted in one of said jaws.

2. In a centering machine, the combination with a rotary marking tool, of a carriage adapted to be reciprocated longitudinally of the axis of said tool, a pair of jaws having mutually interengaging portions, said jaws being movable transversely and horizontally of the carriage, means for adjusting each of said jaws vertically and independently of the other, other means for adjusting each of said jaws horizontally and independently of each other and means for rigidly clamping the jaws in adjusted position while permitting a two-way movement thereof by the carriage.

3. In a centering machine, the combination with a rotary tool, of a carriage adapted to be reciprocated in alignment with said tool, slides movable transversely of the carriage, a pair of jaws, means for removably securing the jaws to said slides, means for adjusting the jaws vertically relative to the slide and other means for adjusting the jaws horizontally relative to the slide, said vertically adjusting means providing three points of contact between said jaws and slides.

4. In a centering machine the combination with a bed, of a rotary tool supported thereon, a carriage, means for manually reciprocating the carriage in alignment with said tool, oppositely disposed slides mounted on said carriage, a pair of jaws removably secured to said slides, means comprising a three point contact for adjusting the jaws vertically relative to the slide, and other means comprising a single point contact, for adjusting the jaws horizontally relative to the slide.

5. In a centering machine, the combination with a carriage, of cross slides comprising members having L-shaped recesses therein, jaws positioned on said slides and within the recesses, adjusting members extending through the jaws and abutting the slides, for adjusting the jaws in one direction relative to the slide, and other members extending through the slides and abutting the jaws, for adjusting the jaws in another direction.

6. In a centering machine, the combination with a carriage, of a pair of cross slides mounted thereon, means for simultaneously moving said slides in opposite directions, a jaw carried by each of said slides, adjusting screws extending through the jaws and abutting the slides for regulating the height of the jaws relative to the slides, and other adjusting screws extending through the slides and abutting the jaws for regulating the horizontal position of each of said jaws relative to the slides.

In testimony whereof, I hereunto affix my signature.

WILLIAM JANNELL.